US009919558B2

(12) United States Patent
Park et al.

(10) Patent No.: US 9,919,558 B2
(45) Date of Patent: Mar. 20, 2018

(54) REAR AXLE CASE OF AGRICULTURAL WORK VEHICLE AND REAR AXLE ASSEMBLY OF AGRICULTURAL WORK VEHICLE, INCLUDING SAME

(71) Applicant: DAEDONG INDUSTRIAL CO., LTD., Daegu (KR)

(72) Inventors: Dong Wook Park, Changnyeong-gun (KR); Jae Hong Lee, Changnyeong-gun (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 15/112,863

(22) PCT Filed: May 28, 2015

(86) PCT No.: PCT/KR2015/005356
§ 371 (c)(1),
(2) Date: Jul. 20, 2016

(87) PCT Pub. No.: WO2015/183011
PCT Pub. Date: Dec. 3, 2015

(65) Prior Publication Data
US 2017/0120677 A1    May 4, 2017

(30) Foreign Application Priority Data

May 29, 2014 (KR) .................. 10-2014-0065129
Sep. 30, 2014 (KR) .................. 10-2014-0131817

(51) Int. Cl.
*B60B 35/16* (2006.01)
*B60B 35/12* (2006.01)
(Continued)

(52) U.S. Cl.
CPC .............. *B60B 35/16* (2013.01); *B60B 35/12* (2013.01); *B60B 35/14* (2013.01); *B60K 17/165* (2013.01);
(Continued)

(58) Field of Classification Search
CPC combination set(s) only.
See application file for complete search history.

(56) References Cited

U.S. PATENT DOCUMENTS 4,179,016 A * 12/1979 Alderman ............ B60K 17/043
188/71.4
4,831,891 A *  5/1989 Kato .................... B60K 17/08
172/7
(Continued)

FOREIGN PATENT DOCUMENTS

JP      53045820 A *  4/1978 .......... B60R 21/131
JP      63-159104 A    7/1988
(Continued)

OTHER PUBLICATIONS

Search Report for International Application No. PCT/KR2015/005356.
(Continued)

*Primary Examiner* — Nicole T Verley
(74) *Attorney, Agent, or Firm* — LRK Patent Law Firm

(57) ABSTRACT

A rear axle case of an agricultural work vehicle and a rear axle assembly including the same. The rear axle case of an agricultural work vehicle includes: a rear axle cover, having a hollow pipe shape, for surrounding a rear axle; a reduction gear cover unitarily provided at the side of the rear axle cover; a differential axle cover integrally formed at the front end of the reduction gear cover so as to cover a differential axle extending to the outside of a rear differential case; and a brake unit cover unitarily provided at an opening of the differential axle cover in a form in which one side opening of the differential axle cover is covered, such that a space in which a multi-disk brake unit can be provided is formed between the brake unit cover and the rear differential case.

20 Claims, 13 Drawing Sheets

(51) Int. Cl.
  *B60K 17/16* (2006.01)
  *B60R 21/13* (2006.01)
  *B60B 35/14* (2006.01)
  *B60R 21/00* (2006.01)
  *B62D 49/06* (2006.01)
  *B62D 21/18* (2006.01)

(52) U.S. Cl.
  CPC .... *B60R 21/131* (2013.01); *B60R 2021/0018* (2013.01); *B60R 2021/0076* (2013.01); *B60Y 2200/22* (2013.01); *B60Y 2200/221* (2013.01); *B60Y 2410/10* (2013.01); *B62D 21/186* (2013.01); *B62D 49/06* (2013.01)

(56) References Cited

U.S. PATENT DOCUMENTS

| | | | | |
|---|---|---|---|---|
| 7,331,423 | B2* | 2/2008 | Inoue | F16H 57/04 184/11.2 |
| 8,381,853 | B2* | 2/2013 | Iwaki | B60L 3/0076 180/165 |
| 2004/0112667 | A1* | 6/2004 | Minoura | B60K 7/0015 180/308 |
| 2007/0182147 | A1* | 8/2007 | Cooper | B60R 21/131 280/756 |
| 2008/0035407 | A1* | 2/2008 | Murata | B60K 7/0015 180/308 |
| 2010/0187799 | A1* | 7/2010 | Schmidt | B60R 21/131 280/756 |
| 2012/0234121 | A1* | 9/2012 | Jensen | F16D 67/00 74/411.5 |
| 2016/0229289 | A1* | 8/2016 | Frohnmayer | B60K 17/08 |
| 2017/0087983 | A1* | 3/2017 | Park | B60K 17/06 |

FOREIGN PATENT DOCUMENTS

| | | | | |
|---|---|---|---|---|
| JP | 07-144504 | A | 6/1995 | |
| JP | 2000-264085 | A | 9/2000 | |
| JP | 2005-016544 | A | 1/2005 | |
| JP | 2010173632 | A * | 8/2010 | .......... B60R 21/131 |
| JP | 2011-122709 | A | 6/2011 | |
| KR | 10-0988155 | B1 | 10/2010 | |
| KR | 10-2011-0107278 | A | 9/2011 | |

OTHER PUBLICATIONS

KIPO Office Action for Korean Application No. 2014-0131817 dated Oct. 31, 2017 which corresponds to the above referenced U.S. application.

* cited by examiner

REAR AXLE CASE OF AGRICULTURAL
WORK VEHICLE AND REAR AXLE
ASSEMBLY OF AGRICULTURAL WORK
VEHICLE, INCLUDING SAME

TECHNICAL FIELD

The present invention relates to a rear axle case for an agricultural work vehicle and a rear axle assembly for an agricultural work vehicle, and more particularly, to a rear axle case fox an agricultural work, vehicle that is adapted to accommodate a rear axle transmitting finally gear-shifted driving power to a rear wheel thereinto, and to a rear axle assembly for an agricultural work vehicle, having the rear axle.

BACKGROUND ART

An agricultural work vehicle which is called 'tractor' is structurally similar to general cars, but it has a powerful engine so that it has good traction force and is strong. As a result, the tractor is generally used for cultivation in agricultural work, and so as to perform the cultivation, further, the tractor has various kinds of agricultural work machines detachably attached to the rear side of the body thereof.

So as to improve the efficiencies of the work, the agricultural work vehicle has to have a large gear-shifting range so that a driving speed and a rotational speed of a power take off (which is referred to as 'PTO') shaft can be adjusted to optimal speeds according to qualities of soil under the work, and accordingly, the agricultural work vehicle adopts a transmission complicated in structure and having a large gear-shifting range.

FIG. 1 is a sectional view showing a conventional transmission assembly for an agricultural work vehicle.

Referring to FIG. 1, a conventional transmission assembly for an agricultural work vehicle largely includes a transmission 1 and a rear differential 9. The transmission 1 includes a shuttle gear-shifting unit 2 for forward/backward gear-shifting, a main gear-shifting unit 3 and a sub gear-shifting unit 4 for providing a large gear-shifting step range, and a front wheel driving unit 5 for performing bi-speed turn and front wheel driving, and the rear differential 9 is adapted to appropriately distribute the power gear-shifted by the transmission 1 to left and right rear wheels.

The shuttle gear-shifting unit 2 of the transmission 1 is a hydraulic multi-plate clutch for performing selective power connection fey the pressure oil whose flowing is permitted by the lever manipulation of a driver, and the main gear-shifting unit 3 has a synchronized multi-stepped (four step) gear. The sub gear-shifting unit 4 has pairs of gears having different gear ratios moving to left and right sides by means of lever manipulation in such a manner as to be selectively engaged with each other.

The front wheel driving unit 5 is a hydraulic multi-plate clutch in the same manner as the shuttle gear-shifting unit 2. The various components constituting the transmission 1 and the rear differential 6 are located protectedly in a closed space formed by a transmission case 8, and oil as a lubricating agent is filled in the transmission case 8 so as to achieve gentle power transmission between gears, gentle shaft rotation, and friction and abrasion reduction between components.

A reference numeral 7 not explained yet in the figure indicates a PTO gear-shifting unit for taking off the engine power from the vehicle body so that the power generated from the engine is utilized as the power for driving the work vehicle, and a reference numeral 35 indicates a counter shaft having gear-shifting gears rotatable unitarily therewith and freely rotatable therefrom.

FIG. 2 is a sectional view showing the rear differential (rear axle assembly) applied to the conventional transmission assembly.

As shown in FIG. 2, the rear differential 9 largely includes a rear differential case 90 in which a differential 91 is embedded to appropriately distribute the driving power gear-shifted according to driving situations to left and right rear wheels, brake cases 93 assembled with left and right sides to protect brake units 92 spaced apart from each other on both sides of the differential 91, and rear axle cases 96 in which rear axles 95 are insertedly fitted.

A ring gear (bevel driven gear) 910 constituting the differential 91 receives power from a bevel pinion, that is, bevel driving gear (not shown) which outputs finally gear-shifted power through main and sub gear-shifting, thereby rotating the differential 91 and differential axles 94 connected to the differential 91, and accordingly, the rear axles 95 connected to the differential axles 94 rotate, so that the left and right rear wheels rotate with the revolutions finally gear-shifted.

However, the conventional rear differential (rear axle assembly) applied to the agricultural work vehicle largely includes three case components, that is, the rear differential case 90, the brake cases 33, and the rear axle cases 36 coupled to the brake cases 93, thereby causing many disadvantages such as complication in structure, increase in the number of parts, failure in reduction of manufacturing cost, and many difficulties in assembling and so on.

DISCLOSURE

Technical Problem

Accordingly, the present invention has been made in view of the above-mentioned problems occurring in the prior art, and it is an object of the present invention to provide a rear axle case fox an agricultural work vehicle and a rear axle assembly for an agricultural work vehicle, having the same, that is capable of forming components unitarily with each other, thereby providing advantages such as reduction in the number of parts, decrease in manufacturing cost, and improvement in assimilability and so on.

It is another object of the present invention to provide a rear axle case for an agricultural work vehicle and a rear axle assembly for an agricultural work vehicle, having the same, that is capable of efficiently arranging components in a limited space, thereby providing compactness in structure.

It is yet another object of the present invention to provide a rear axle case for an agricultural work vehicle and a rear axle assembly for an agricultural work vehicle, having the same, that is capable of providing a rollover protective structure (hereinafter; referred to as 'ROPS') mounting stands formed unitarily therewith, thereby additionally attaching an ROPS thereto, without having any separate mounting space.

Technical Solution

To accomplish the above-mentioned objects, according to a first aspect of the present invention, there is provided a rear axle case for an agricultural work vehicle, including: a hollow pipe-shaped rear axle cover for surroundingly covering a rear axle; a reduction gear cover formed unitarily with the side periphery of the rear axle cover; a differential axle cover formed unitarily with one side periphery of the reduction gear cover to cover a differential axle extended to the outside of a transmission case; and a brake unit cover formed unitarily with the opening side of the differential axle cover in such a manner as to cover one side opening of the differential axle cover to form a given space, in which a multi-plate brake unit is located, between the transmission case and the brake unit cover.

According to the present, invention, desirably, the reduction gear cover has a reduction gear accommodation space for accommodating a reduction gear power-transmittably connected to the differential axle thereinto and is open on the side contacted with the transmission case on the opposite side to the rear axle cover.

According to the present invention, desirably, the differential axle cover includes; a differential axle accommodation space for accommodating the differential axle extended to the outside of the transmission case thereinto in such a manner as to communicate with the internal space of the reduction gear cover; and a bearing fixing part adapted to fittedly fix a bearing member rotatably supporting the differential axle thereto.

According to the present invention, desirably, the brake unit cover comprises; a through hole formed on the center thereof in such a manner as to pass the differential axle therethrough; and a bearing fixing surface formed along the outer peripheral surface of the through hole.

According to the present invention, desirably, the rear axle case for an agricultural work vehicle further includes a brake operating lever mounting part formed unitarily with the periphery of the differential axle cover.

According to the present invention, desirably, the center of the reduction gear cover, the center of the differential axle cover, and the center of the rear axle cover have the same heights as each other.

According to the present invention, desirably, the diameter of the reduction gear cover is larger than the diameters of the differential axle cover and the rear axle cover.

According to the present invention, desirably, the center of the rear axle cover corresponds to the center of the reduction gear cover.

According to the present invention, desirably, the rear axle case for an agricultural work vehicle further includes ROPS mounting stands formed unitarily with the rear outer peripheries of the rear axle cover and the reduction gear cover so as to mount an ROPS thereon.

According to the present invention, desirably, the rear axle case for an agricultural work vehicle further includes: lower link attaching stands formed unitarily with the outer periphery of the rear axle cover or the reduction gear cover under the ROPS mounting stands; and check link attaching surfaces formed on the side adjacent to the lower link attaching stands.

According to the present invention, desirably, the rear axle case for an agricultural work vehicle further including seat frame support rod mounting members formed unitarily with the upper outer periphery of the reduction gear cover to provide attaching surfaces for mounting seat frame support rods thereon.

To accomplish the above-mentioned objects, according to a second aspect of the present invention, there is provided a rear axle assembly for an agricultural work vehicle, including: a pair of left and right rear axle cases according to the first aspect of the present invention; a rear differential case disposed between the rear axle cases; transmission, members located power-transmittably over the rear differential, case and the rear axle cases; and brake units located between the rear axle cases and the rear differential case.

According to the present invention, desirably, the rear axle assembly for an agricultural work vehicle further includes an ROPS supported against ROPS mounting stands formed unitarily with the rear outer peripheries of the rear axle cases.

According to the present invention, desirably, the rear axle assembly for an agricultural work vehicle further includes: lower links mounted on lower link attaching stands formed unitarily with the outer peripheries of rear axle covers or reduction gear covers under the ROPS mounting stands; and check links mounted on check link attaching surfaces formed on the side adjacent to the lower link attaching stands in such a manner as to be connected to the lower links to adjust a distance between the lower links.

According to the present invention, desirably, the rear axle assembly for an agricultural work vehicle further includes seat frame support rods mounted on seat frame support rod mounting members formed unitarily with the upper outer peripheries of the reduction gear covers of the rear axle cases.

According to the present invention, desirably, the transmission members include; a differential disposed in the rear differential case to distribute driving power to both rear wheels; differential axles extended to left and right sides from the differential in such a manner as to allow portions thereof to be extended to the outside of the rear differential case; reduction gears accommodated into the reduction gear covers of the rear axle cases in such a manner as to be power-transmittably connected to the differential axles extended to the outside of the rear differential case; and rear axles coupled to the reduction gears in such a manner as to allow portions thereof to be freely rotatably located in the rear axle covers of the rear axle cases.

According to the present invention, desirably, the rear axle assembly for an agricultural work vehicle further includes a differential fixing part for limiting the deviation in the power transmission of the differential.

According to the present invention, desirably, each brake unit, which is a dry type multi-plate brake having rotary side discs and a fixing side plate sequentially disposed at a given distance, comprises: a rotary plate having a plurality of ball grooves formed circumferentially on one surface thereof in such a manner as to become increased in depth; and steel balls interposed between the ball grooves of the rotary plate and ball grooves of the rear differential case corresponding to the ball grooves of the rotary plate.

According to the present invention, desirably, the rear axle assembly for an agricultural work vehicle further includes: an input end formed unitarily with a portion of the outer periphery of the rotary plate to allow a rotary force for generating a brake force to be inputted thereto; and an operating cam having a camp surface coming into contact with the input end.

According to the present invention, desirably, the contact surface of the input end with the operating cam is plane, and the operating cam has a plane portion contacted with the contact surface of the input end and an arch-shaped curved portion formed on the rear surface of the plane portion.

Advantageous Effects

According to the present invention, the rear axle case for the agricultural work vehicle is formed unitarily with the brake unit case part for protecting the brake unit, so that when compared with the conventional structure in which the rear axle case and the brake unit case are separated from each other, the present invention has more advantages such as reduction in the number of parts, simplification of configuration, decrease in manufacturing cost, high price competitiveness and easiness in assembling and so on.

In addition, the rear axle assembly for the agricultural work vehicle according to the present invention has one unitary structure and ensures the space portion in which the components are efficiently arranged, thereby providing compactness in structure, and further, the rear axle assembly has the ROPS mounting stands formed unitarily with the outer peripheries of the rear axle cases, thereby additionally attaching the ROPS thereto, without having any separate mounting space.

BEST MODE FOR INVENTION

Hereinafter, an explanation on a rear axle case for an agricultural work vehicle according to the present invention will be in detail given with reference to the attached drawing. In the description, if it is determined that the detailed explanation on the well known technology related to the present invention makes the scope of the present invention not clear, the explanation will be avoided for the brevity of the description.

Figure 1:
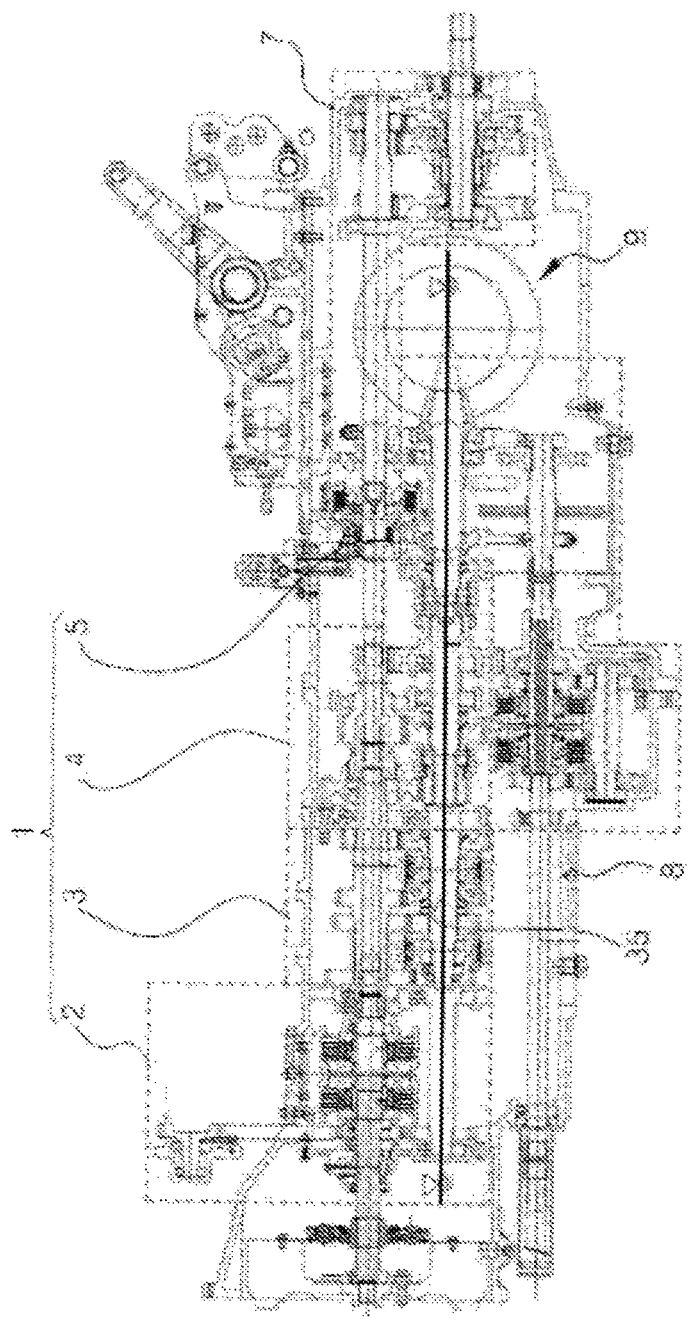
FIG. 1 is a sectional view showing a conventional transmission assembly for an agricultural work vehicle.
Figure 2:
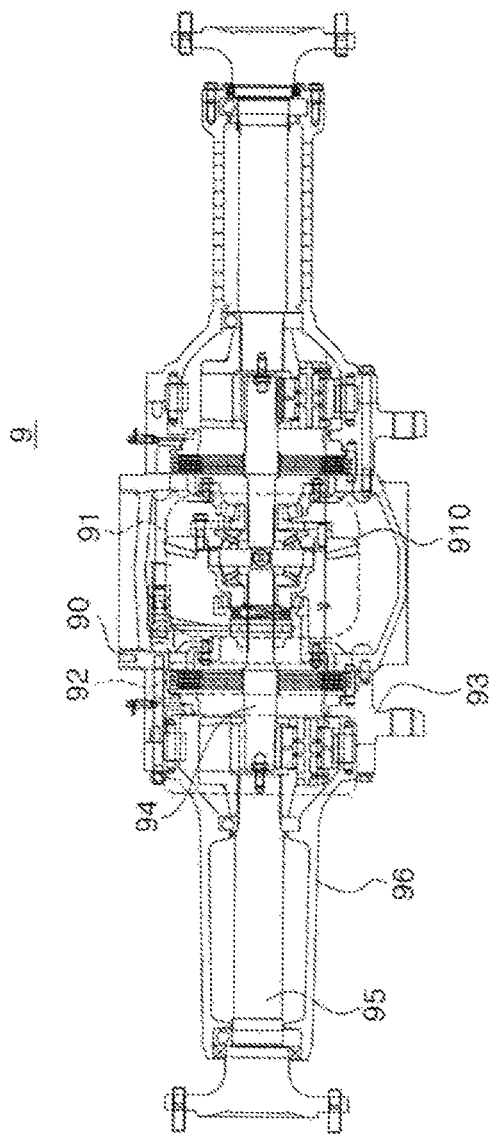
FIG. 2 is a sectional view showing the rear differential applied to the conventional transmission assembly.
Figure 3:
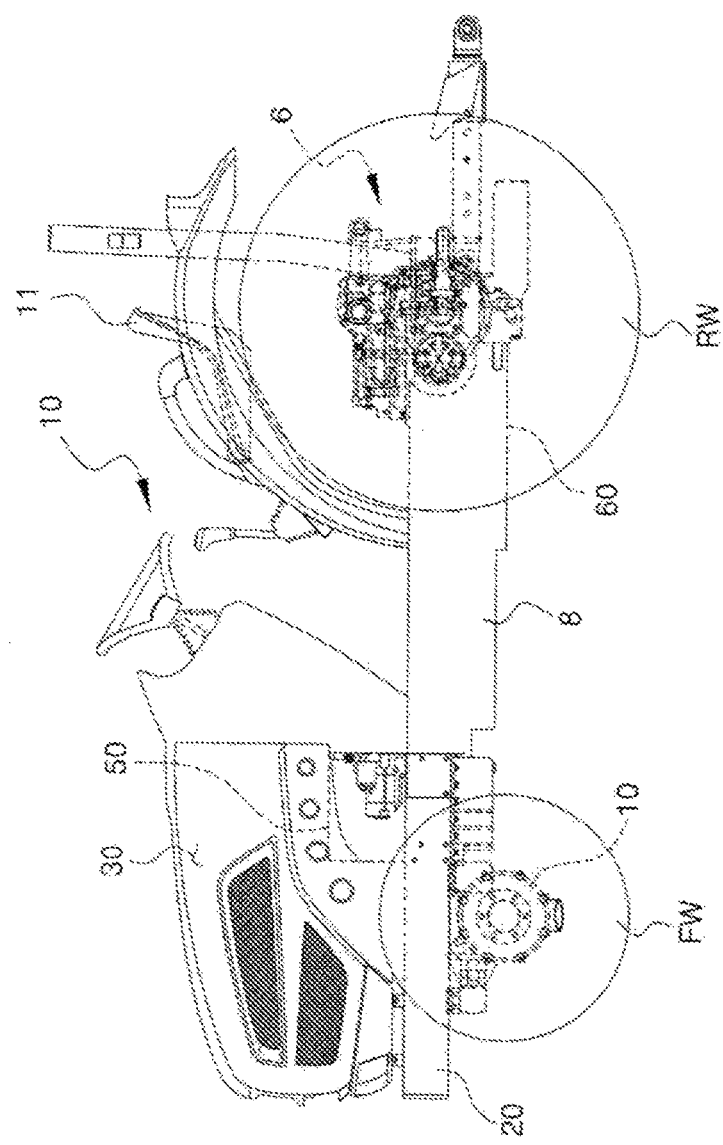
FIG. 3 is a side view showing an agricultural work vehicle applied to the present invention.
Figure 4:
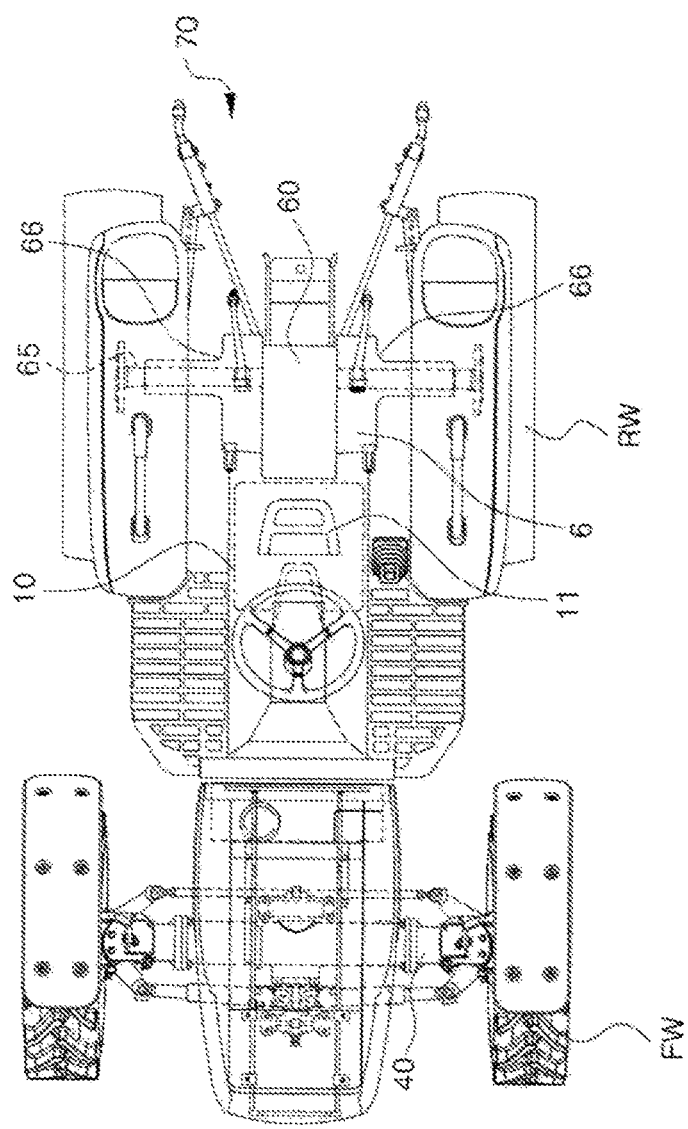
FIG. 4 is a plan view showing the agricultural work vehicle applied to the present invention.

FIG. 3 is a side view showing an agricultural work vehicle applied to the present invention, and FIG. 4 is a plan view showing the agricultural work vehicle applied to the present invention, first, the whole configuration of an agricultural work vehicle applied to the present invention will be described.

Referring to FIGS. 3 and 4, the agricultural work vehicle applied to the present invention has an engine room 30 located on the front side of a body thereof, which is covered with a bonnet. The engine room 30 includes an engine 50 and principal components related to the driving of the vehicle mounted therein, and a driver room 10 is located behind the engine room 30, which includes a steering handle (having no reference numeral in the drawing) for front wheel steering and all kinds of levers, buttons and switches for manipulation of the vehicle body.

Further, a three-point link lift 70 is located on the rear side of the vehicle body behind the driver room 10 to perform traction connection to a variety of work machines. Also, the vehicle body having the engine room 30, the driver room 10 and the link lift 70 is supported movably by means of a pair of front steering wheels FW disposed on both sides of the underside portion of the engine room 10 and by means of a pair of rear driving wheels RW disposed on both sides of the link lift 70.

Furthermore, a front axle housing 40 having a pair of left and right differential axles embedded thereinto is located on the underside of an engine frame 20 located at the front side of the vehicle body in a width direction of the vehicle body, and the differential axles are connected to the front wheels FW and transmit power to the front wheels FW. Also, the rear wheels RW located on the rear side of the vehicle body are coupled to the front ends of exposed portion of rear axles 65 covered with rear axle cases 66 located on both sides of a rear differential case 60 disposed on the rear portion of the vehicle body.

The engine frame 20 and the rear differential case 60 are connected to each other by means of a transmission case 8 located on the underside of the driver room 10 in a longitudinal direction or the vehicle body, thereby constituting a chassis in a rigid manner, and a differential (as will be discussed later) is located in the rear differential case 60 to distribute the power finally gear-shifted through a transmission disposed in the transmission case 3 to the left and right rear wheels.

Now, an explanation on the configuration of the rear axle cases located on both sides of the rear differential case according to the present invention will be given with reference to FIGS. 5 to 9.

Referring to FIGS. 5 to 9, each rear axle case 66 according to the present invention includes a hollow pipe-shaped rear axle cover 660 for surroundingly covering the rear axle 65 and a reduction gear cover 662 formed unitarily with the side periphery of the rear axle cover 660. Further, the rear axle case includes a differential axle cover 664 formed unitarily with one side periphery of the reduction gear cover 662 to cover a differential axle 62 (See FIG. 11) extended outwardly from one side of the rear differential case 60.

Further, the rear axle case 66 includes a brake unit cover 666 formed unitarily with the opening side of the differential axle cover 664 in such a manner as to cover one side opening of the differential axle cover 664, and upon assembling with the brake unit cover 666, a given space is formed between the rear differential case 60 and the brake unit cover 666 so that a multi-plate brake unit 68 is located therein.

The reduction gear cover 662 provides an accommodation space S1 for accommodating a reduction gear 63 (See FIG. 11) power-transmittably connected to the differential axle 62. The reduction gear cover 662 is open on the side contacted with the rear differential case 60 on the opposite side to the rear axle cover 660, and through the open portion of the reduction gear cover 662, the reduction gear 63 is insertedly located in the accommodation space S1 of the reduction gear cover 662.

The differential axle cover 664 provides an accommodation space S2 for accommodating the differential axle 62 extended outwardly from one side of the rear differential case 60 in such a manner as to communicate with the internal space of the reduction gear cover 662, that is, the reduction gear accommodation space S1, and further, a bearing fixing part 665 is located in the differential axle accommodation space S2 in such a manner as to fittedly fix a bearing member rotatably supporting one end portion of the differential axle 62 thereto.

The center C1 of the reduction gear cover 662, the center C2 of the differential axle cover 664, and the center C3 of the rear axle cover 660 have the same heights as each other, and the diameter of the reduction gear cover 652 is larger than those of the differential axle cover 664 and the rear axle cover 660. The center C3 of the rear axle cover 660 corresponds to the center C1 of the reduction gear cover 662.

The brake unit cover 666 has a through hole 667 formed on the center thereof in such a manner as to pass the differential axle 62 exposed from one side of the rear differential ease 60 therethrough and a bearing fixing surface 668 formed along the outer peripheral surface of the through hole 667 in such a manner as to allow a bearing member rotatably supporting a portion of the differential axle 62 to be pressed fitted thereto.

According to the present invention, the rear axle case 66 further includes a brake operating lever mounting part 669 formed unitarily with the periphery of the differential axle cover 664. Further, the rear axle case 66 includes ROPS mounting stands 661 formed unitarily with the rear end periphery of the rear axle cover 660 or the reduction gear cover 662 so as to mount an ROPS thereon.

According to the present invention, the rear axle case 66 further includes lower link attaching stands 670 formed unitarily with the outer periphery of the rear axle cover 660 or the reduction gear cover 662 under the ROPS mounting stands 661 and check link attaching surfaces 672 formed on the side adjacent to the lower link attaching stands 679. Further, the rear axle case 66 includes seat frame support rod mounting members 674 formed unitarily with the upper outer periphery of the reduction gear cover 662.

The lower link attaching stands 679 are adapted to attach lower links 72 (See FIG. 16) connecting rear work machines such as a rake, a rotavator and so on to the rear axle case 66 thereto, and the check link attaching surfaces 672 are adapted to attach check links 74 (See FIG. 16) adjusting a distance between the lower links 72 located on both side rear axle cases 66 thereto.

The seat frame support rod mounting members 674 are adapted to attach seat frame support rods supporting a seat frame (not shown) located on the underside of a driver seat 11 (See FIG. 3) thereto.

Next, an explanation on the configuration of a rear axle assembly having the rear axle cases according to the present invention will be given with reference to FIGS. 10 and 11.

Figure 5:
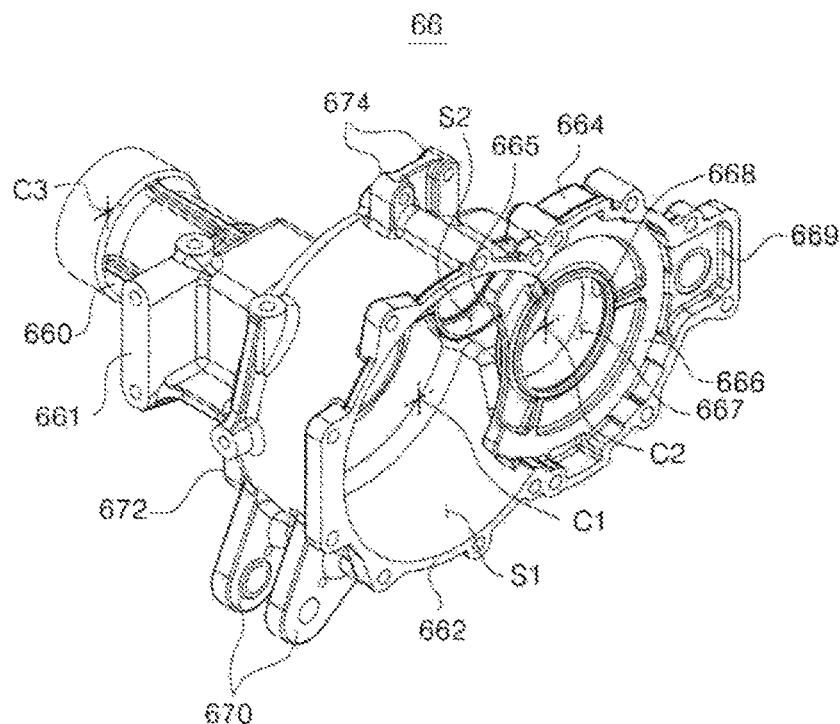
FIG. 5 is a perspective view showing a rear axle case according to the present invention, which is applied to the agricultural work vehicle of FIG. 4.
Figure 6:
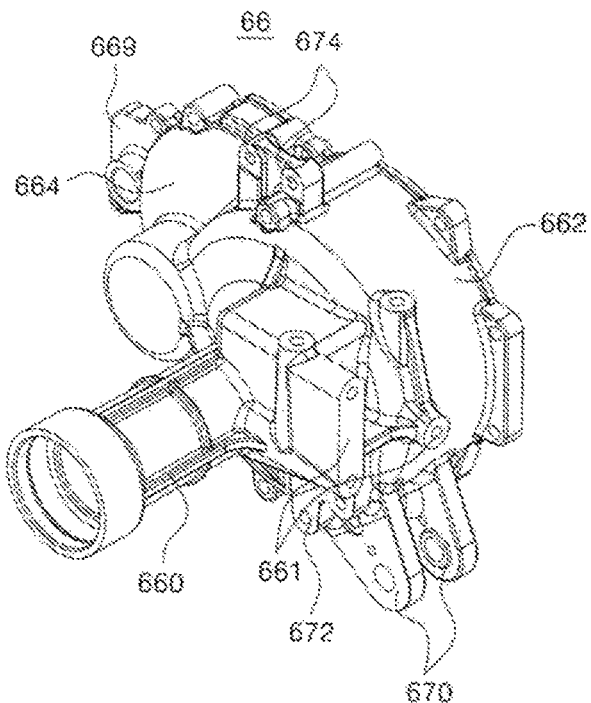
FIG. 6 is a perspective view showing the rear axle case viewed at a different angle from that in FIG. 5.
Figure 7:
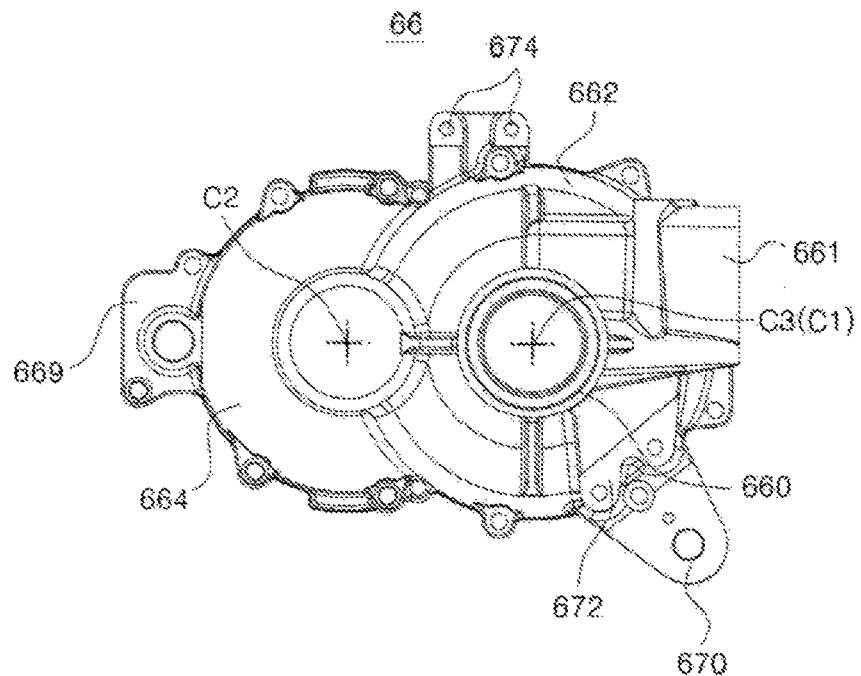
FIG. 7 is a left side view showing the rear axle case of FIG. 5.
Figure 8:
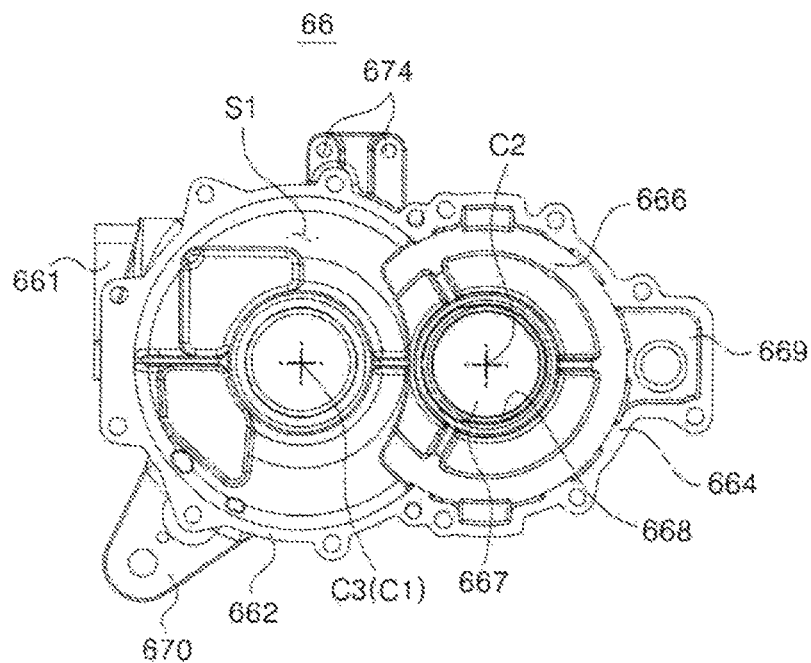
FIG. 8 is a right side view showing the rear axle case of FIG. 5.
Figure 9:
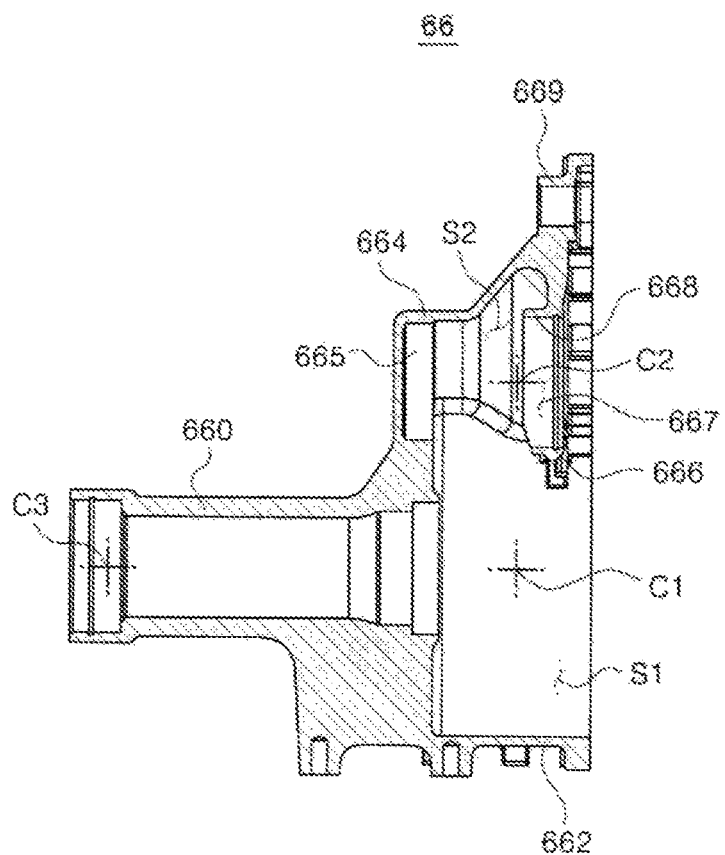
FIG. 9 is a plan, sectional view showing the rear axle case of FIG. 5.
Figure 10:
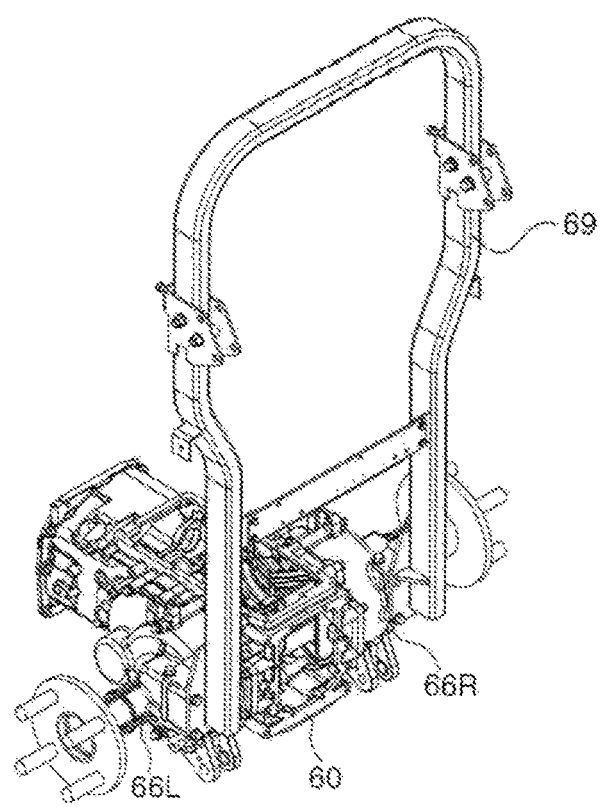
FIG. 10 is a perspective view showing a rear axle assembly for an agricultural work vehicle, which includes the rear axle case of FIG. 5.
Figure 11:
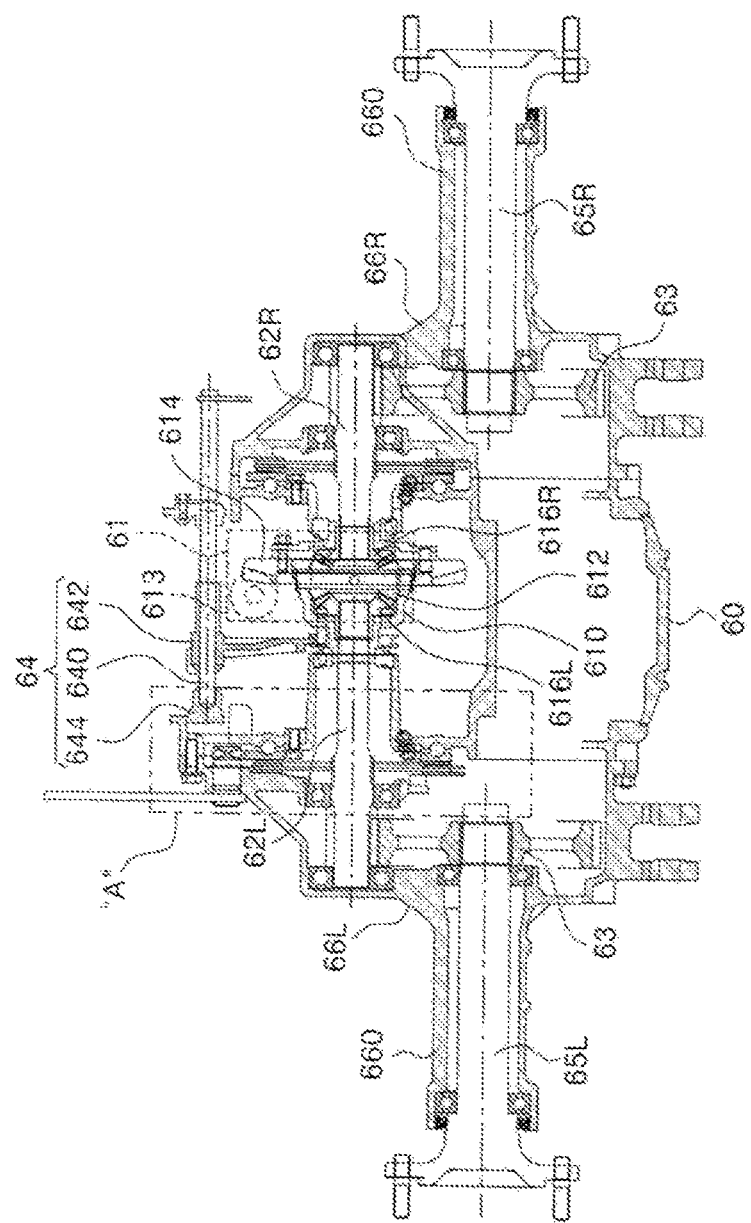
FIG. 11 is a horizontal sectional view showing the rear axle assembly for an agricultural work vehicle along a width direction thereof, which includes the rear axle case of FIG. 5.

FIG. 10 is a perspective view showing a roar axle assembly for an agricultural work vehicle, which includes the rear axle case of FIG. 5, and FIG. 11 is a horizontal sectional view showing the rear axle assembly for an agricultural work vehicle along a width direction thereof, which includes the rear axle case of FIG. 5.

Referring to FIGS. 10 and 11, the rear axle assembly 6 according to the present invention includes the rear axle cases 66 disposed oppositely in left and right sides thereof, the rear differential case 60 disposed between the rear axle cases 66, transmission members located power-transmittably over the rear differential case 60 and the rear axle cases 66, and the brake units 68 located between the rear axle cases 66 and the rear differential case 60.

The transmission members include a differential 61 disposed in the rear differential case 60 and a pair of left and right differential axles 62 extended from the differential 61. Further, the transmission members include the reduction gears 63 accommodated into the reduction gear cover 662 of the rear axle case 66 in such a manner as to be power-transmittably connected to the differential axles 62 and rear axles 65 coupled to the reduction gears 63 in such a manner as to be extended from the interiors of the rear axle cases 66 to the outside of the rear axle cases 66.

The differential 61, which is adapted to distribute driving power to both side wheels (left and right rear wheels), includes a differential case 610, a differential pinion 612 disposed in the differential case 610, a ring gear 614 rotating unitarily with the differential case 610 and engaged with a bevel pinion 613 mounted on an output shaft outputting finally gear-shifted power, and a pair of left and right side gears 615 fitted to the differential axles 62 and engaged with the differential pinion 612.

Such differential 61 is provided in the well known technology, and accordingly, the detailed configuration and operation of the differential 61 will be not explained anymore for the brevity of the description.

The power distributed through the differential 61 is transmitted to the differential axles 62 extended to both sides of the differential 61 through the side gears 616. Next, the power is transmitted to the reduction gears 63 accommodated in the reduction gear covers 662 of the rear axle cases 66 in such a manner as to be power-transmittably connected to the differential axles 62 and then to the wheels (rear wheels) through the rear axles 65 extended to the outside of the rear axle cases 66 along the rear axle covers 660.

A reference numeral 64 indicates a differential fixing part for limiting the deviation in the power transmission of the differential 61. In the work environments wherein load is collected only to one side wheel, the differential fixing part 64 is adapted to remove the application of driving power only to the other side wheel having relatively small load, and accordingly, the differential fixing part 64 connects the differential axles 62 and the differential case 610 to each other in a cooperatively operating manner so that the two differential axles 62 can rotate with the same revolutions as each other.

The differential fixing part 64 desirably includes a differential fork shaft 640 connected to a differential fixing lever (not shown), a differential fork 642 connected, to the differential fork shaft 640 in a cooperatively operating manner, and a differential shift 644 rotatably disposed unitarily with one side differential axle 62 (on the left side in the drawing) in such a manner as to move along the differential axle 62, so that the differential shift 644 operates cooperatively with the advancing and retreating motions of the differential fork 64, moves one side differential axle 62, and thus connects one side differential axle 62 and the differential case 610 to each other in such a manner as to be rotatable unitarily with each other.

That is, if the differential fixing lever is stepped to operate the differential fixing part 64, the differential fork shaft 640 rotates and the differential fork 642 moves in an axial direction of the differential fork shaft 640. Next, the differential shift 644 operates cooperatively with the movement of the differential fork 642 and moves in a direction wherein one side differential axle 62 and the differential case 610 are power-transmittably connected directly to each other, thereby fixing the differential 61.

Figure 12:
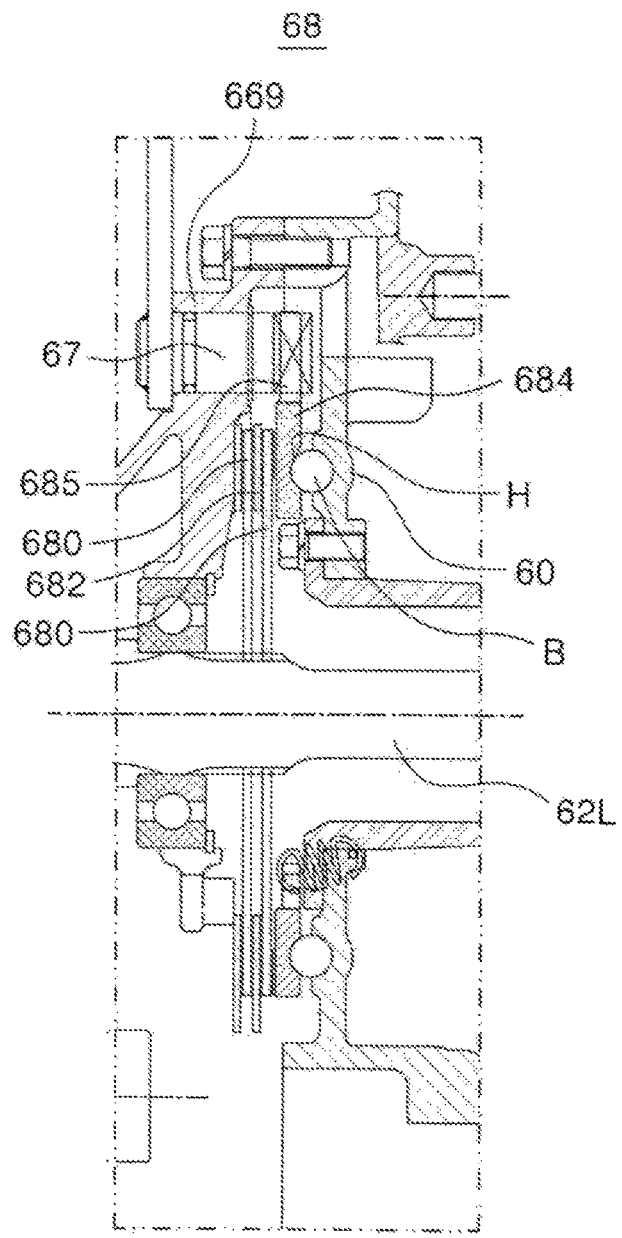
FIG. 12 is an enlarged view showing a portion 'A' in which a brake unit of FIG. 11.

Referring now to FIG. 12, the brake unit 68 will be explained.

As shown, the brake unit 68 is a dry type multi-plate brake having rotary side discs 680 and a fixing side plate sequentially disposed at a given distance and includes a rotary plate 684 having a plurality of ball grooves H formed circumferentially on one surface thereof in such a manner as to become increased in depth and steel balls B interposed between the ball grooves H of the rotary plate 684 and ball grooves (whose reference numerals are not indicated herein) of the rear differential case 60 corresponding to the ball grooves H.

Figure 13A:
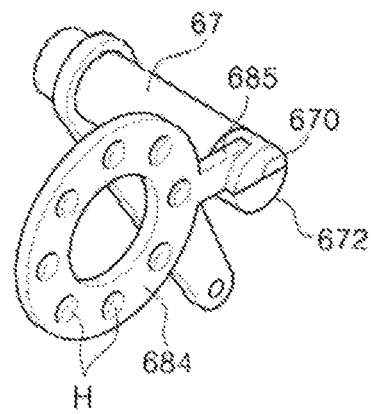
FIGS. 13A and 13B are enlarged perspective views showing a contacted portion between a rotary plate of the brake unit and an operating cam.
Figure 13B:
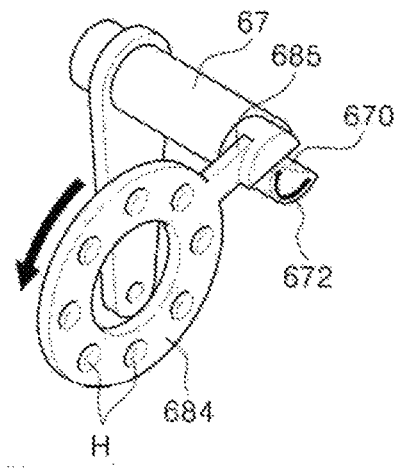

An input end 685 is formed unitarily with a portion of the outer periphery of the rotary plate 684 to allow a rotary force for generating a brake force to be inputted thereto, and the input end 685 comes into contact with the cam surface of an operating cam 67 mounted on the brake operating lever mounting part 669. At this time, as shown in FIGS. 13A and 13B, the contact surface of the input end 685 with the operating cam 67 is plane, and the operating cam 67 includes a plane portion contacted with the contact surface of the input end 685 and an arch-shaped curved portion 672 formed on the rear surface of the plane portion 670.

Under the above-mentioned configuration, if a brake lever (not shown) pulls, the operating cam 67 and the rotary plate 684 contacted therewith rotate, the steel balls B are deviated from the ball grooves H of the rotary plate 684 through the rotation of the rotary plate 684. Accordingly, the rotary plate 684 moves forward in the directions of the rotary side discs 680 by the depths of the ball grooves H, and the fixing side plate 682 pressurizes the rotary side discs 680, thereby generating the brake force.

Contrarily, if the brake lever is returned to its original state, the operating cam 67 and the rotary plate 684 contacted therewith rotate reversely, the steel balls B are located again in the ball grooves H of the rotary plate 684 through the rotation of the rotary plate 684. Accordingly, the rotary plate 684 and the fixing side plate 682 move backward to their original position by the depths of the ball grooves H, thereby releasing the brake state.

Figure 14:
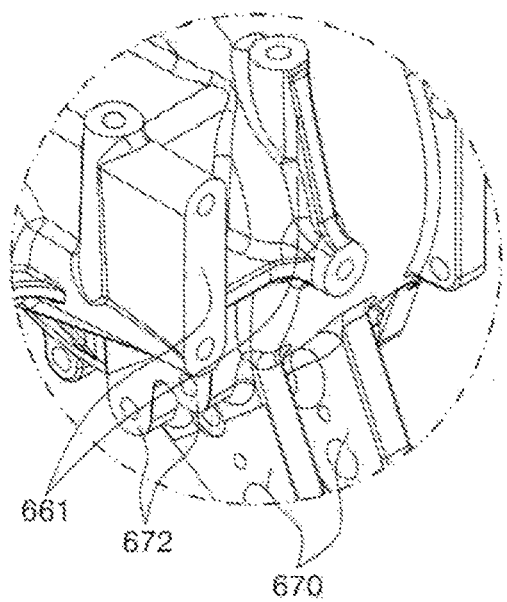
FIG. 14 is an enlarged view showing a portion in which ROPS mounting stands are located to mount an ROPS for a driver thereon.
Figure 15:
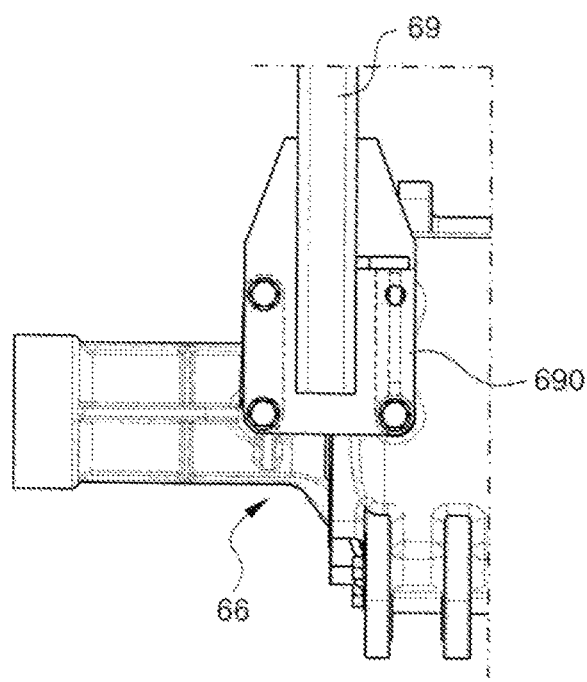
FIG. 15 is a rear view showing the ROPS mounted on the ROPS mounting stands of FIG. 14.

On the other hand, FIG. 14 is an enlarged view showing a portion in which ROPS mounting stands are located to mount an ROPS for a driver thereon, and FIG. 15 is a rear view showing the ROPS mounted on the ROPS mounting stands of FIG. 14.

As shown in FIGS. 14 and 15, the rear axle cases 66 have the ROPS mounting stands 661 formed unitarily with the rear outer peripheries of the rear axle covers 661. An ROPS 69 is supported against the ROPS mounting stands 661 in such a manner as to be extended higher than the driver's seat behind the driver's seat to protect the driver from rollover accidents.

In this case, the ROPS mounting stands 661 may be changed in shape in accordance with the sectional shapes or whole configuration of the ROPS 69, without any limitation therein, and further, the ROPS 69 has mounting brackets 690 located on the lower ends thereof to form mounting surfaces for coupling the ROPS mounting stands 661 thereto.

Figure 16:
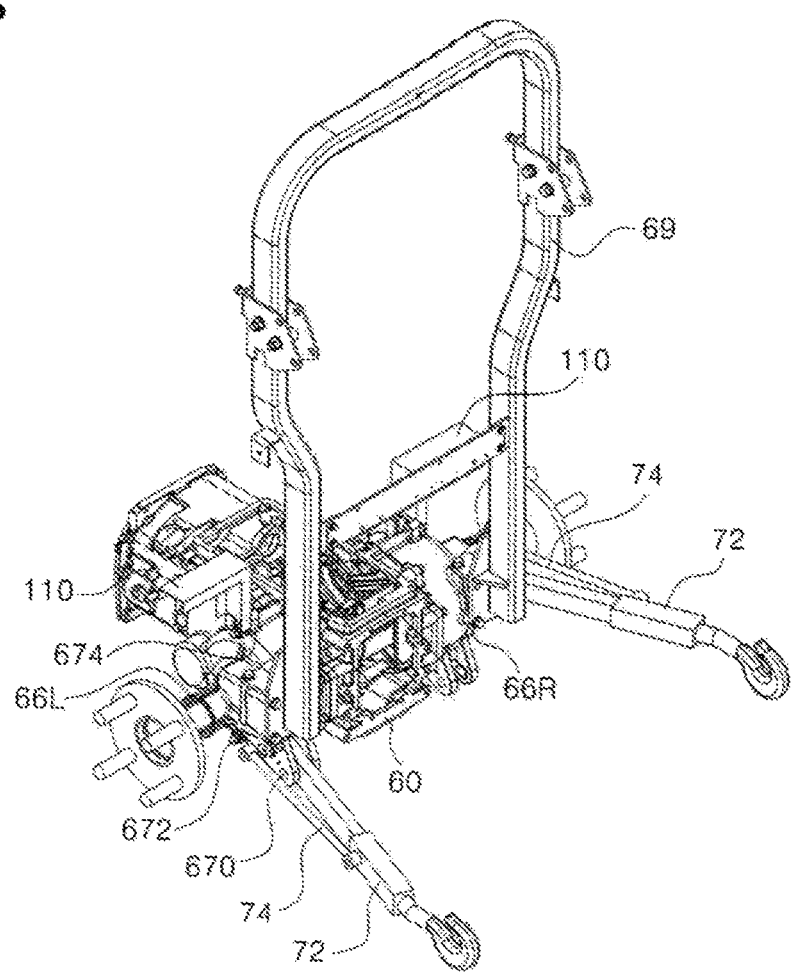
FIG. 16 is a perspective view showing lower links and check links for connecting a rear side work machine to the rear axle cases constituting the rear axle assembly for the agricultural work vehicle, and seat frame support rods.

FIG. 16 is a perspective view showing lower links and check links for connecting a rear side work machine to the rear axle cases constituting the rear axle assembly for the agricultural work vehicle, and seat frame support rods.

As shown in FIG. 16, the rear axle assembly according to the present invention further includes one pair of left and right lower links 72 mounted on the lower link attaching stands 670 formed unitarily with the outer periphery of the rear axle covers 660 or the reduction gear covers 662 under the ROPS mounting stands 661. The lower links 72 are adapted to connect rear work machines such as a rake, a rotavator and so on to the rear side of the agricultural work vehicle in such a manner as to be adjustable in length according to the shapes of the work machines.

The check link attaching surfaces 672 formed on the side adjacent to the lower link attaching stands 670 are adapted to attach the check links 74 thereto so as to adjust a distance between the pair of left and right lower links 72. Further, the rear axle assembly according to the present invention includes seat frame support rods 110 attached to the seat frame support rod mounting members 674 so as to support the seat frame located on the underside of the driver seat 11 thereagainst.

As described above, the rear axle case for the agricultural work vehicle according to the present invention is formed unitarily with the brake unit case part for protecting the brake unit, so that when compared with the conventional structure in which the rear axle case and the brake unit case are separated from each other, the present invention has more advantages such as reduction in the number of parts, simplification of configuration, decrease in manufacturing cost, high price competitiveness and easiness in assembling and so on.

In addition, the rear axle assembly for the agricultural work vehicle according to the present invention has one unitary structure and ensures the space portion in which the components are efficiently arranged, thereby providing compactness in structure, and further, the rear axle assembly has the ROPS mounting stands formed unitarily with the outer peripheries of the rear axle cases, thereby additionally attaching the ROPS thereto, without having any separate mounting space.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATION ON REFERENCE NUMERALS

| | |
|---|---|
| 6: rear axle assembly | 8: transmission case |
| 60: rear differential case | 61: differential |
| 62: differential axle | 63: reduction gear |
| 64: differential fixing part | 65: rear axle |
| 66: rear axle case | 67: operating cam |
| 68: brake unit | 69: ROPS |
| 660: rear axle cover | 661: ROPS mounting stand |
| 662: reduction gear cover | 664: differential axle cover |
| 666: brake unit cover | 669: brake operating lever mounting part |

The invention claimed is:

1. A rear axle case for an agricultural work vehicle, comprising:
a hollow pipe-shaped rear axle cover for surroundingly covering a rear axle;
a reduction gear cover formed unitarily with the side periphery of the rear axle cover;

a differential axle cover formed unitarily with one side periphery of the reduction gear cover to cover a differential axle extended to the outside of a rear differential case through an opening formed on one side thereof; and
a brake unit cover formed unitarily with the opening side of the differential axle cover in such a manner as to cover the opening of the differential axle cover to form a given space in which a multi-plate brake unit is located between the rear differential case and the brake unit cover.

2. The rear axle case for an agricultural work vehicle according to claim 1, wherein the reduction gear cover has a reduction gear accommodation space for accommodating a reduction gear power-transmittably connected to the differential axle thereinto and is open on the side contacted with the transmission case on the opposite side to the rear axle cover.

3. The rear axle case for an agricultural work vehicle according to claim 1, wherein the differential axle cover comprises:
a differential axle accommodation space for accommodating the differential axle extended to the outside of the transmission case thereinto in such a manner as to communicate with the internal space of the reduction gear cover; and
a bearing fixing part adapted to fittedly fix a bearing member rotatably supporting the differential axle thereto.

4. The rear axle case for an agricultural work vehicle according to claim 1, wherein the brake unit cover comprises:
a through hole formed on the center thereof in such a manner as to pass the differential axle therethrough; and
a bearing fixing surface formed along the outer peripheral surface of the through hole.

5. The rear axle case for an agricultural work vehicle according to claim 1, further comprising a brake operating lever mounting part formed unitarily with the periphery of the differential axle cover.

6. The rear axle case for an agricultural work vehicle according to claim 3, wherein the center of the reduction gear cover, the center of the differential axle cover, and the center of the rear axle cover have the same heights as each other.

7. The rear axle case for an agricultural work vehicle according to claim 6, wherein the diameter of the reduction gear cover is larger than the diameters of the differential axle cover and the rear axle cover.

8. The rear axle case for an agricultural work vehicle according to claim 6, wherein the center of the rear axle cover corresponds to the center of the reduction gear cover.

9. The rear axle case for an agricultural work vehicle according to claim 1, further comprising ROPS (Rollover Protective Structure) mounting stands formed unitarily with the rear outer peripheries of the rear axle cover and the reduction gear cover so as to mount an ROPS thereon.

10. The rear axle case for an agricultural work vehicle according to claim 9, further comprising:
lower link attaching stands formed unitarily with the outer periphery of the rear axle cover or the reduction gear cover under the ROPS mounting stands; and
check link attaching surfaces formed on the side adjacent to the lower link attaching stands.

11. The rear axle case for an agricultural work vehicle according to claim 1, further comprising seat frame support rod mounting members formed unitarily with the upper outer periphery of the reduction gear cover to provide attaching surfaces for mounting seat frame support rods thereon.

12. A rear axle assembly for an agricultural work vehicle, comprising:
a pair of left and right rear axle cases according to claim 1;
the rear differential case disposed between the rear axle cases;
transmission members located power-transmittably over the rear differential case and the rear axle cases; and
brake units located between the rear axle cases and the rear differential case.

13. The rear axle assembly for an agricultural work vehicle according to claim 12, further comprising an ROPS supported against ROPS mounting stands formed unitarily with the rear outer peripheries of the rear axle cases.

14. The rear axle assembly for an agricultural work vehicle according to claim 13, further comprising:
lower links mounted on lower link attaching stands formed unitarily with the outer peripheries of rear axle covers or reduction gear covers under the ROPS mounting stands; and
check links mounted on check link attaching surfaces formed on the side adjacent to the lower link attaching stands in such a manner as to be connected to the lower links to adjust a distance between the lower links.

15. The rear axle assembly for an agricultural work vehicle according to claim 12, further comprising seat frame support rods mounted on seat frame support rod mounting members formed unitarily with the upper outer peripheries of the reduction gear covers of the rear axle cases.

16. The rear axle assembly for an agricultural work vehicle according to claim 12, wherein the transmission members comprise:
a differential disposed in the rear differential case to distribute driving power to both rear wheels;
differential axles extended to left and right sides from the differential in such a manner as to allow portions thereof to be extended to the outside of the rear differential case;
reduction gears accommodated into the reduction gear covers of the rear axle cases in such a manner as to be power-transmittably connected to the differential axles extended to the outside of the rear differential case; and
rear axles coupled to the reduction gears in such a manner as to allow portions thereof to be freely rotatably located in the rear axle covers of the rear axle cases.

17. The rear axle assembly for an agricultural work vehicle according to claim 16, further comprising a differential fixing part for limiting the deviation in the power transmission of the differential.

18. The rear axle assembly for an agricultural work vehicle according to claim 12, wherein each brake unit, which is a dry type multi-plate brake having rotary side discs and a fixing side plate sequentially disposed at a given distance, comprises:
a rotary plate having a plurality of ball grooves formed circumferentially on one surface thereof in such a manner as to become increased in depth; and
steel balls interposed between the ball grooves of the rotary plate and ball grooves of the rear differential case corresponding to the ball grooves of the rotary plate.

19. The rear axle assembly for an agricultural work vehicle according to claim 18, further comprising:

an input end formed unitarily with a portion of the outer periphery of the rotary plate to allow a rotary force for generating a brake force to be inputted thereto; and an operating cam having a camp surface coming into contact with the input end.

20. The rear axle assembly for an agricultural work vehicle according to claim 19, wherein the contact surface of the input end with the operating cam is plane, and the operating cam has a plane portion contacted with the contact surface of the input end and an arch-shaped curved portion formed on the rear surface of the plane portion.

\* \* \* \* \*